US006956841B1

(12) United States Patent
Stahle et al.

(10) Patent No.: US 6,956,841 B1
(45) Date of Patent: Oct. 18, 2005

(54) RECEIVER AND METHOD OF RECEIVING A DESIRED SIGNAL

(75) Inventors: Lauri Stahle, Vantaa (FI); Mikko Jarvela, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/577,502

(22) Filed: May 24, 2000

(51) Int. Cl.[7] .............................................. H04B 7/216
(52) U.S. Cl. ..................... 370/342; 370/479
(58) Field of Search .............................. 370/328, 335, 370/342, 479, 96.5; 455/422, 456, 63, 67.1, 455/67.3, 132, 137, 138, 139

(56) References Cited

U.S. PATENT DOCUMENTS

| | | | | |
|---|---|---|---|---|
| 5,621,752 A | * | 4/1997 | Antonio et al. ............. | 375/144 |
| 6,201,828 B1 | * | 3/2001 | El-Tarhuni et al. ......... | 375/150 |
| 6,215,814 B1 | | 4/2001 | Ylitalo et al. | |
| 6,272,168 B1 | * | 8/2001 | Lomp et al. ................ | 375/222 |
| 6,320,899 B1 | * | 11/2001 | Chang et al. ............... | 375/147 |
| 6,324,160 B1 | * | 11/2001 | Martin et al. ............... | 370/209 |
| 6,370,182 B2 | * | 4/2002 | Bierly et al. ................ | 375/140 |
| 6,370,397 B1 | * | 4/2002 | Popovic et al. ............. | 455/561 |

FOREIGN PATENT DOCUMENTS

| | | |
|---|---|---|
| EP | 999 652 | 5/2000 |
| GB | 2 331 901 | 6/1999 |
| WO | WO 00/21201 | 4/2000 |
| WO | WO 01/18975 | 3/2001 |

OTHER PUBLICATIONS

U.S. Appl. No. 60/181,571 Bierly et al., filed Feb. 10, 2000.*
A.F. Naguib, A. Paulraj, "Performance of CDMA Cellular Networks With Base-Station Antenna Arrays," Proc. Intenational Zurich Seminar on Digital Communications, pp. 87-100, Zurich, Switzerland, Mar. 1994.
Ylitalo et al., "On RAKE Allocation for CDMA Receiver Employing Antenna Arrays," Waves of the Year 2000+, 8th IEEE International Symposium Program, Proceedings PIJMRC '97, Helsinki, Finland, Sep. 1-4, 1997, vol. 1, pp. 73-78.

* cited by examiner

Primary Examiner—Huy D. Vu
Assistant Examiner—Daniel Ryman
(74) Attorney, Agent, or Firm—Pillsbury Winthrop Shaw Pittman LLP

(57) ABSTRACT

The invention relates to a receiver for receiving a signal of a desired user, which signal may arrive at the receiver in different components along several different paths at several different delays. The receiver includes an antenna array, rake branches, and at least one search branch. At least one rake branch includes a plurality of beam formers, a plurality of correlators coupled to the inputs of the beam formers, a demodulator coupled to the outputs of the correlators, a code generator for generating codes required by the correlators, controls means, and calculation means. The calculation means are adapted to calculate and transmit to the control means, on the basis of the outputs of the correlators, information on how the code generator and the beam formers are to be controlled.

12 Claims, 6 Drawing Sheets

RECEIVER AND METHOD OF RECEIVING A DESIRED SIGNAL

FIELD OF THE INVENTION

The invention relates to a method and receiver for receiving a signal of a desired user, which signal may arrive at the receiver in different components along several different paths at several different delays. The invention relates particularly to a CDMA receiver implemented on the rake principle.

BACKGROUND OF THE INVENTION

The present invention is applicable for use in cellular radio systems employing CDMA (Code Division Multiple Access). CDMA is a multiple access method based on spread spectrum technique and it has recently been applied in cellular radio systems along with the previous FDMA and TDMA. CDMA has a plurality of advantages over prior methods, such as spectral efficiency and simplicity of frequency planning.

In the CDMA method, a narrow-band user data signal is multiplied to a relatively broad band by a spreading code having a considerably broader band than the data signal. In some known tests systems, bandwidths such as 1.25 MHz, 10 MHz and 25 MHz have been used. When multiplied, the data signal is spread to the entire band to be used. All users transmit simultaneously using the same frequency band. A separate spreading code is used on each connection between a base station and a mobile station, and the signals of different users can be distinguished from each other in the receivers on the basis of each user's spreading code.

Matched filters in receivers are synchronized with a desired signal, which they recognize by means of the spreading code. In the receiver, the data signal is restored to the original band by multiplying it again by the spreading code that was used in transmission. In an ideal case, signals multiplied by another spreading code do not correlate and are not restored to the narrow band. Accordingly, as far as the desired signal is concerned, they appear as noise. The spreading codes used in the system are preferably selected such that they are mutually orthogonal, i.e. do not correlate.

In a typical mobile phone environment, signals between a base station and a mobile station propagate along several paths between a transmitter and a receiver. Such multipath propagation is mainly caused by the signal being reflected from surrounding surfaces. Because of different propagation delays, signals that have propagated along different paths arrive at the receiver at different times. In COMA, multipath propagation may be utilized in signal reception in the same way as diversity. The receiver structure usually employed in COMA is a multibranch receiver structure, in which each branch is synchronized with a signal component that has propagated along a different path. Each branch is an individual receiver element that serves to compose and demodulate one received signal component. In a conventional CDMA receiver, the signals of the different receiver elements are combined preferably, either coherently or incoherently, whereby a high-quality signal is achieved.

COMA systems can also apply what is known as soft handover, in which case a mobile station can simultaneously communicate with several base stations by utilizing macro diversity. Consequently, during handover, mobile station connection quality remains high and the user does not detect any break in the connection.

Accordingly, interference caused by other connections to the desired connection appears in the receiver as evenly distributed noise. This is also true when a signal is examined in the angular domain according to the incoming directions of the signals detected in the receivers. Consequently, interference caused by other connections to the desired connection appears in the receiver as distributed in the angular domain, i.e. the interference is relatively evenly distributed in different incoming directions.

The capacity of the COMA, which can be measured by means of spectral efficiency, has been further improved by sectorization. In this case a cell is divided into sectors of a desired size that are serviced by directional antennas. This allows the mutual noise level caused by the mobile stations to be lowered significantly in the base station receiver. This is based on the fact that, on average, the interference is evenly distributed in the different incoming directions, the number of which can thus be reduced by means of sectorization. Sectorization can naturally be implemented in both transmission directions. The capacity gain provided by sectorization is proportional to the number of sectors.

A sectorized cell may also utilize a special form of soft handover, i.e. softer handover, wherein a mobile station performs handover from one sector to another by communicating simultaneously with both sectors. Even though soft handover improves connection quality, and sectorization increases system capacity, the movement of the mobile stations naturally causes them to perform several handovers from one sector to another. This loads the processing capacity of the base station controller. Several soft handovers also bring about a situation where several mobile stations communicate simultaneously with more than one sector (usually two), whereby the capacity gain provided by sectorization is lost, since a mobile station signal is audible within a wide sector.

The multiple access interference of the CDMA systems has also been reduced by means of different known multiple access interference cancellation (IC) methods and multi-user detection (MUD). These methods are best suited for reducing the interference originating from the user's own cell, and system capacity can thus be doubly increased compared with a system implemented without interference cancellation. However, these methods do not significantly improve the size of the coverage area of the base station as compared with the prior art. IC/MUD techniques are also complicated to implement, and have therefore mainly been designed for the uplink direction.

Furthermore, a method that is known as SDMA (Space Division Multiple Access) has been designed wherein users are distinguished from each other on the basis of location. This is performed by adjusting the beams of the receiver antennas at the base station in the desired directions according to the locations of the mobile stations. For this purpose, adaptive antenna arrays, i.e. phased antennas, and processing of a received signal are used, by means of which the mobile stations are tracked.

The utilization of SDMA with CDMA provides several advantages over prior methods, e.g. sectorization. If the sector beams are narrowed in sectorization in order to increase spectral efficiency, the number of handovers to be performed from one sector to another also increases. This in turn excessively increases the calculation capacity required in the base station controller.

For the application of SDMA, the background art is illustrated in A. F. Naguib, A. Paulraj: *Performance of CDMA Cellular Networks With Base- Station Antenna Arrays* (Proc. International Zürich Seminar on Digital Communications, pp. 87 to 100, Zürich, Switzerland, March 1994), which is incorporated herein by reference. In SDMA, a signal is received by means of an antenna array, and the received signal is shaped by means of digital signal processing in such a way that the directivity patterns of the antennas are suitable for the stages following the shaping in the receiver. In prior art solutions, the received signal is shaped in order to maximize the signal-to-interference ratio of the desired signal. In other words, the received signal is shaped in such a way that the directivity pattern of the antenna array minimizes the interference caused by the other connections in the desired signal. In the solution according to the aforementioned reference, each detected signal component is subjected to individual beam shaping. i.e. the impulse response must be known before the shaping.

BRIEF DESCRIPTION OF THE INVENTION

It is consequently an object of the present invention to implement a reception method and a receiver by means of which spectral efficiency can be further improved as compared with prior CDMA systems, while the technical implementation of the equipment remains advantageous. It is a further object of the invention to apply SDMA efficiently in a CDMA environment by utilizing a new type of multidimensional search.

This is achieved by a method of the invention for receiving a signal of a desired user, which signal may arrive at the receiver in different components along several different paths at several different delays, the method comprising receiving the signal by an antenna array composed of more than one element, demodulating the signal components by one or more rake branches, calculating the two-dimensional impulse response of the received signal by searching for the incoming directions and delays of the received signal components, determining the most favorable signal components, transmitting information on the signal components found to the rake branches, processing the signal at each rake branch by a beam former in such a way that the output of the beam former comprises a signal component received from a desired direction, correlating the output signal of the beam former in correlators, demodulating the correlated signal, generating codes required by the correlators by a code generator, controlling the code generators and beam formers on the basis of the incoming direction and delay of the signal component, monitoring the incoming direction and delay variation of the signal component on the basis of the output signals of the correlators, and controlling the code generator and the beam formers by means of said monitoring.

The invention also relates to a receiver for receiving a signal of a desired user, which signal may arrive at the receiver in different components along several different paths at several different delays, the receiver comprising an antenna array composed of more than one element for receiving the signal, one or more rake branches for demodulating the received signals, at least one search branch adapted to calculate the two-dimensional impulse response of the received signal by searching for the incoming directions and delays of the received signal components, and to transmit information on the most favorable components found to the rake branches, and in which at least one rake branch comprises a number of beam formers, and a number of correlators coupled to the outputs of the beam formers, and a demodulator coupled to the outputs of the correlators, a code generator for generating the codes required by the correlators, control means adapted to control the operation of the code generator and the beam formers, to which control means information is received from the search branch about the incoming direction and delay of the signal component, and calculation means whose inputs comprise the outputs of the correlators, the calculation means being adapted to calculate and transmit to the control means, on the basis of the outputs of the correlators, information on how the code generator and the beam formers are to be controlled.

The method and system of the invention provide a plurality of advantages. In preferred embodiments of the invention, CDMA and SDMA techniques can preferably be applied simultaneously, and the best signal components of the desired signal can be found and received by such equipment whose practical implementation is not too complex.

BRIEF DESCRIPTION OF THE FIGURES

The invention will now be described in greater detail in conjunction with preferred embodiments with reference to the attached drawings, in which.

DETAILED DESCRIPTION OF THE PREFERRED EMBODIMENTS

Figure 1:
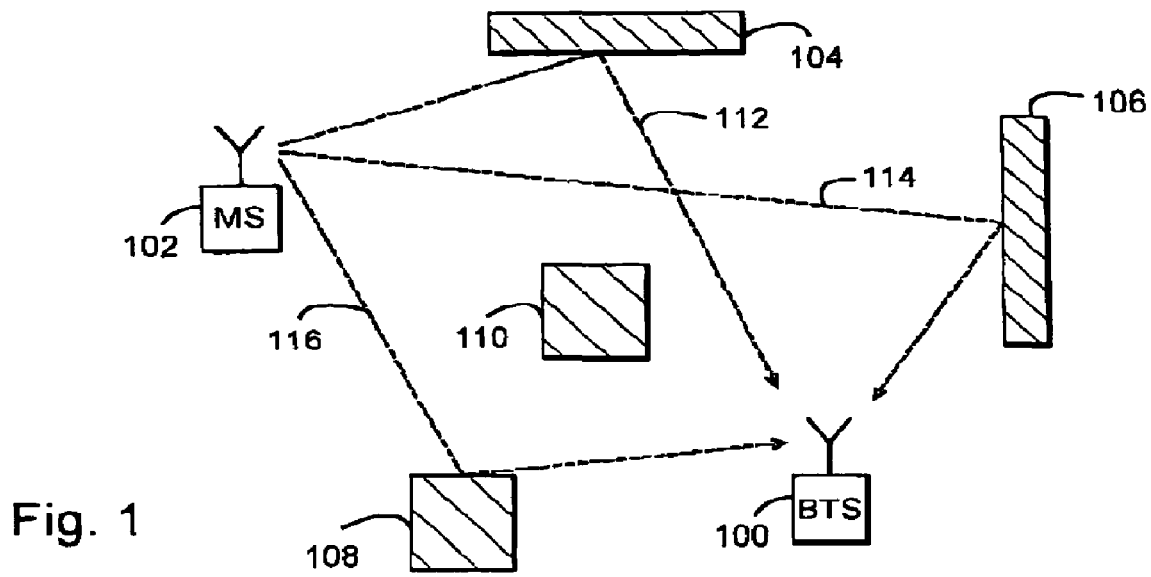
FIG. 1 illustrates multipath propagation of a signal between a mobile station and a base station.

FIG. 1 illustrates typical multipath propagation of a transmitted signal in a cellular system. The figure shows a base station 100 and a mobile subscriber terminal 102 communicating therewith. A characteristic feature of cellular radio systems is that mobile stations are surrounded by surfaces that reflect and scatter radio waves. Such surfaces include buildings, and walls formed by nature, such as mountains and hills. Mobile stations typically transmit using an omni directional antenna pattern. The figure illustrates a few rays 112, 114, 116 originating from a mobile station. Surfaces 104, 108, situated close to the mobile station 102, reflect the transmitted signal, and it therefore arrives at the antenna of the base station 100 along several different paths, the delay between the different signal components being, however, quite short. Reflecting surfaces situated further, 106 in the figure, such as larger buildings and mountains, produce signal components 114 which arrive at the base station 100 several, even dozens of microseconds later. The terrain may also show obstacles 110 that prevent a direct connection between the mobile station and the base station.

Figure 2A:
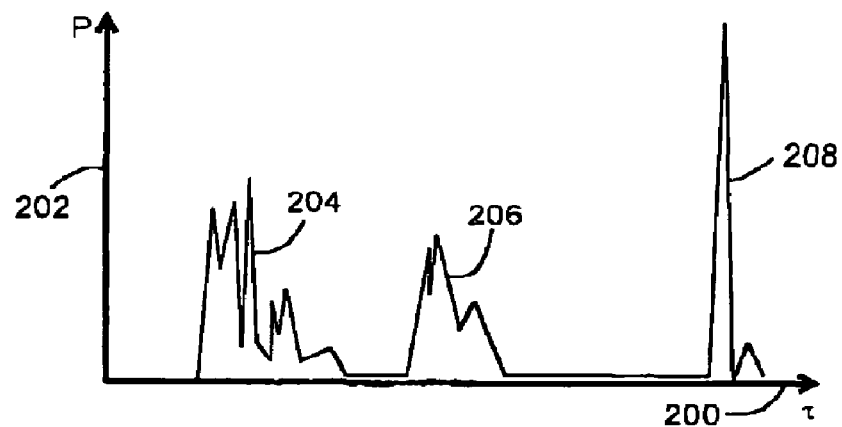
FIG. 2a illustrates scattering caused by multipath propagation of a signal in the time domain.

FIG. 2a illustrates, in the time domain, an example of a momentary delay of signal components caused by multipath propagation of a signal at a base station receiver. The horizontal axis 200 of the schematic figure shows the time and the vertical axis 202 shows the power of the received signal. In the example of FIG. 2a, the base station receiver has detected three groups of signal components 204, 206, 208, which have arrived at the receiver at different times and among which component 208 is significantly more delayed than the others.

Figure 2B:
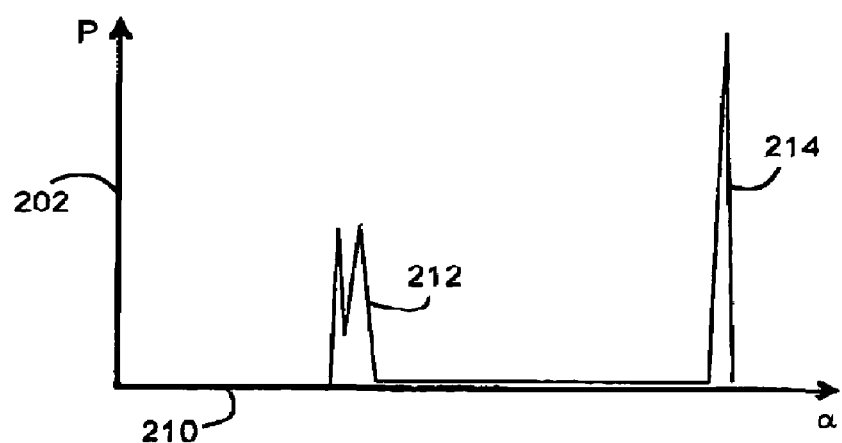
FIG. 2b illustrates scattering caused by multipath propagation of a signal in the angle of arrival domain.

As the example in FIG. 1 shows, the different signal components arrive not only at different times but also from different directions. Consequently, it may be stated that the signal scatters not only in the time domain, but also in the angular domain, the latter of which can be described by the angle of arrival (AoA) of the signal. FIG. 2b illustrates an example of momentary scattering as a function of the angle of arrival, caused by multipath propagation of the signal, at the base station receiver. The vertical axis 202 of FIG. 2b shows the power of the received signal component, and the horizontal axis 210 shows the angle of arrival. In the example of FIG. 2b, the signal components 212, 214 arrive from two directions.

In large cells, called macro cells, in which base station antennas are situated high up, signal components arrive at the antenna at only a few different angles of arrival, which are usually in the vicinity of the direct ray between the mobile station and the base station. In small micro cells, where base station antennas are usually situated below the roofs of buildings, the angles of arrival of the signal components are found to show far greater dispersion, since in the same way as the mobile stations, the base stations are often surrounded by several reflecting surfaces situated nearby.

Multipath propagation has been described above in the transmission direction from a mobile station to a base station (uplink direction). It is naturally clear that a corresponding phenomenon also occurs in the opposite direction from a base station to a mobile station (downlink direction). It can also be stated that multipath routes are mainly symmetrical in both directions, since scattering and reflection are not highly dependent on frequency. However, it should be noted that fast signal fadings are mutually independent in different transmission directions. Therefore, if a base station detects a signal component that has arrived from a mobile station at an angle of arrival of $\alpha_0$, then transmitting a signal at the same angle $\alpha_0$ directs the signal in the direction of the mobile station, except for fast fadings.

On the basis of the above, it can be stated that, in base stations, a multipath propagation environment, typical of cellular systems, results in the reception of a signal that is distributed in time into several components that are delayed differently and, in the angular domain, into components arriving from several different directions. Both distribution profiles vary in time since subscriber terminals move, but the variation is quite slow, i.e. in the range of a few seconds, and the profiles can be synchronized with and monitored.

Consequently, the received signal components are characterized by the multidimensionality of the type described above that is illustrated above by the time/angle domain, i.e. the $(\alpha, \tau)$ domain. The present invention provides a reception method and a receiver for advantageously receiving such signal components.

Figure 3:
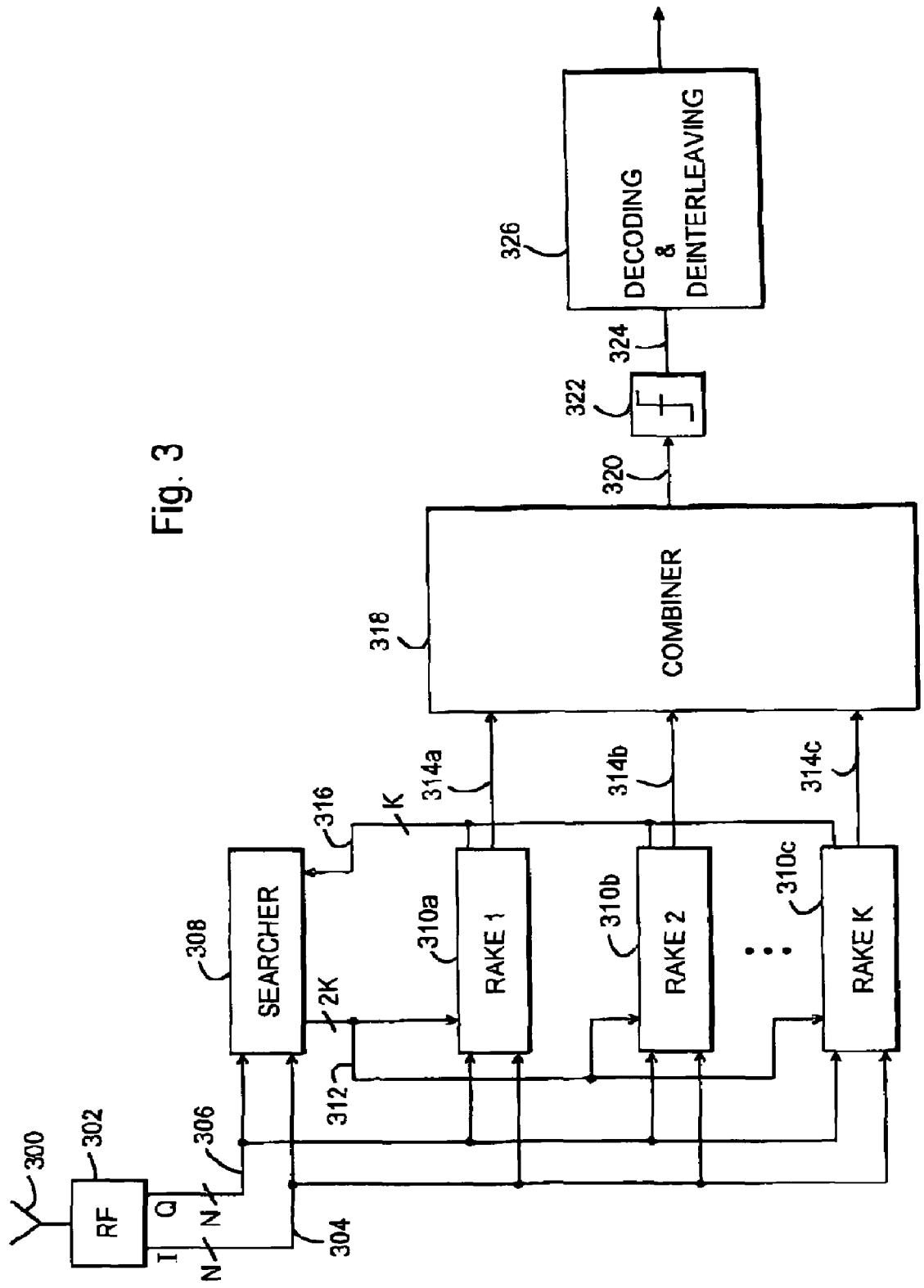
FIG. 3 shows an example of the structure of a receiver according to the invention.

Let us view the structure of a receiver according to a preferred embodiment of the invention by means of FIG. 3. The receiver comprises an antenna array 300, comprising more than one element, for receiving a signal. The structure of the antenna array is known per se. The signal received by the antenna array is applied to a receiver pre-stage 302 in which the received radio frequency signal is converted into a lower frequency and in which signal branches I and Q are separated from one another in accordance with prior art. Consequently, the output of the pre-stage comprises signal branches I and Q 304, 306, of the received signal, which are applied to a receiver search branch 308 and to a number of rake branches 310a to 310c. The number of rake branches can vary according to the purpose of use of the receiver. The receiver may comprise one branch or, typically, several branches.

The search branch 308 is adapted to calculate the two-dimensional impulse response of a received signal by searching for the incoming directions and delays of the received signal components. i.e. to determine the location of the received signal components in the time/angle domain, i.e. the $(\alpha, \tau)$ domain. Accordingly, the search branch measures the impulse response according to FIG. 2a and the angular dispersion according to FIG. 2b, and these are used to find out the delays at which and the directions from which the received signal components arrived. Angular dispersion may be measured in the manners described for the rake branches. From the search branch, information 312 is conveyed to the rake branches about the delays of the signal components that were found and selected to be followed, and the incoming directions from which the delays were found.

Branches I and Q 304, 306, of the received signal and the delay and incoming direction information 312 from the search branch 308 about the signal component assigned thereto are received as input at the rake branches 310a to 310c. Each rake branch follows the variations in the delay and incoming direction of the signal component assigned thereto, and demodulates the component. The structure of the rake branch will be described in more detail later.

The outputs of the rake branches comprise demodulated signal components 314a to 314c. If a rake branch loses synchronization with its signal component, it notifies the search branch 308 thereof by means of a synchronization-lost signal 316. The search branch then sends once more the delay and incoming direction information 312 to the rake branch.

The demodulated signal components 314a to 314c are applied to a combiner 318, which combines the signal components using some known combination method, such as maximum ratio combination.

The output of the combiner 318 comprises a combined signal 320. If soft decisions are used in the combination, the combined signal is applied to a decision means 322, which produces hard symbol decisions. If hard decisions are used in the combination, this step is not needed.

Hard decisions 324 are applied to decoding and deinterleaving means in which the combined signal is decoded and in which any interleaving used in transmission is removed. The signal so obtained is further applied to the other parts of the receiver. The receiver components 310a to 310c following the rake branches can be implemented in known manners.

Figure 4A:
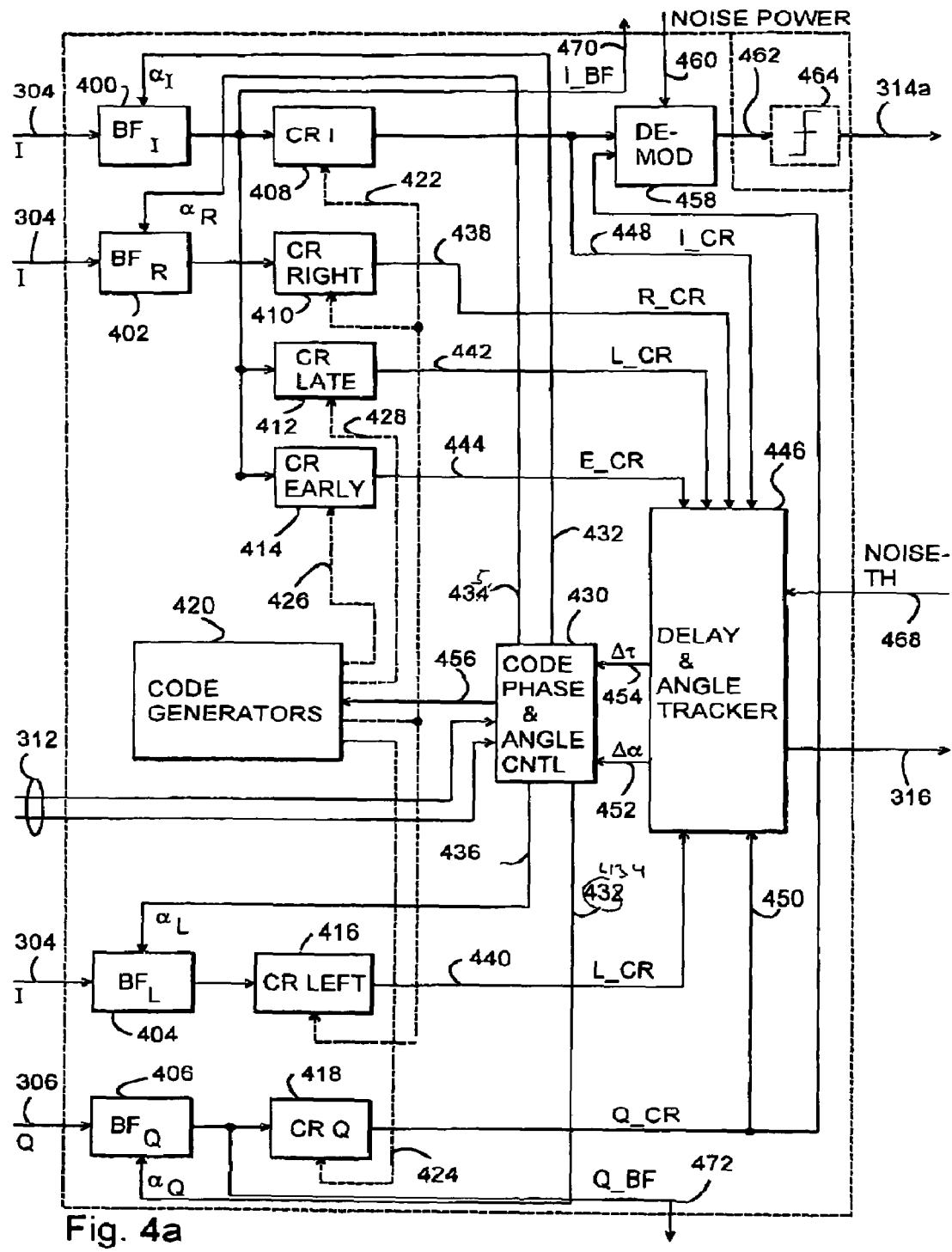
FIGS. 4a, 4b and 4c show an example of the structure of a rake branch.
Figure 4B:
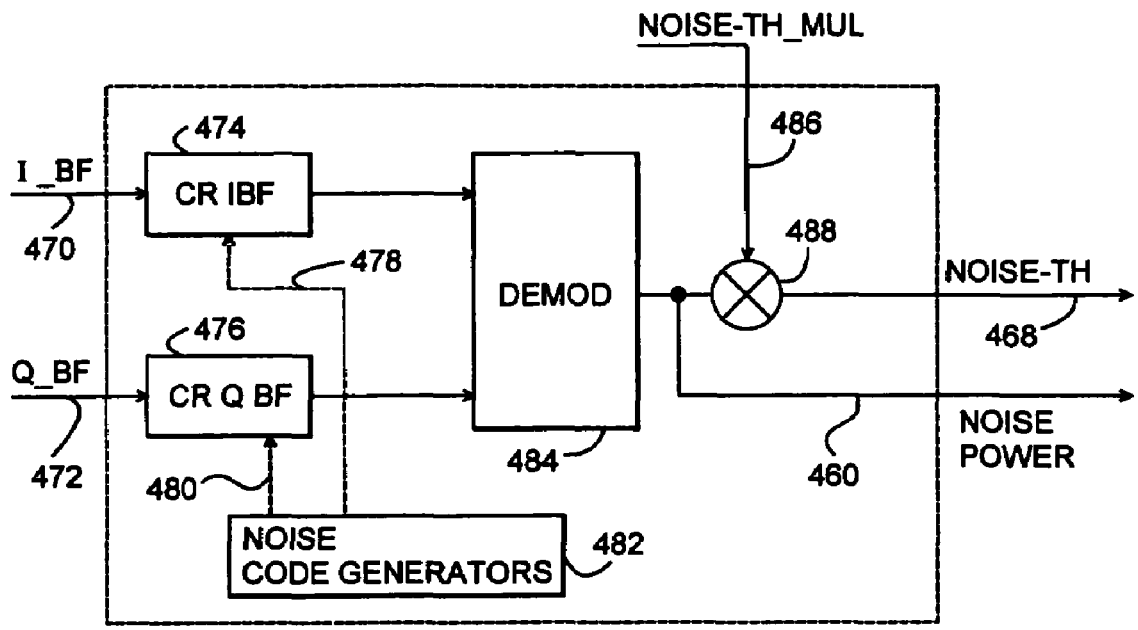
Figure 4C:
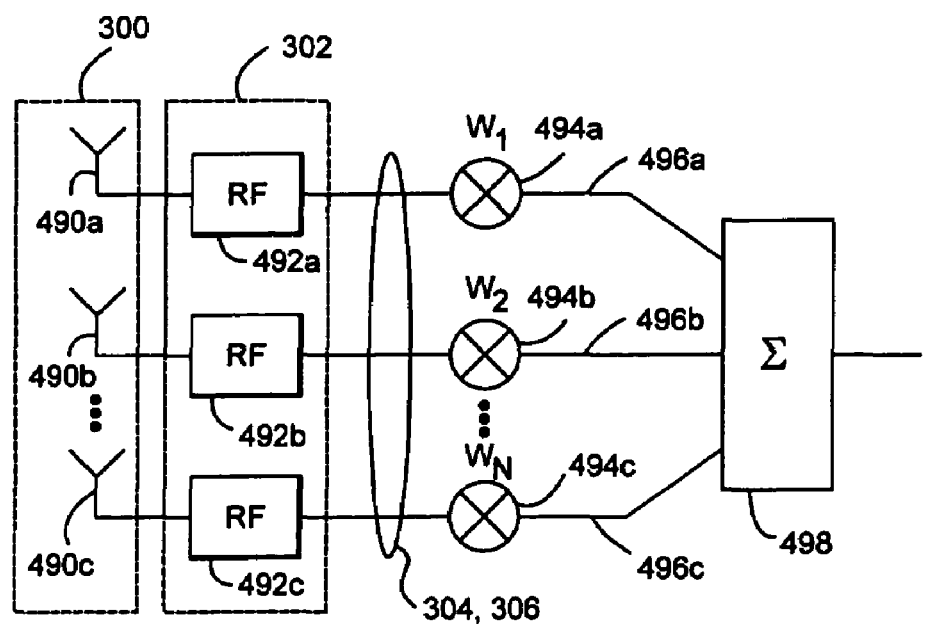

Let us view the structure of a rake branch according to a preferred embodiment of the invention by means of FIGS. 4a, 4b and 4c.

From the receiver pre-stage 302, signals I and Q 304, 306 are received as input at the rake branch. The signals are applied to a number of beam formers 400 to 406. From the beam formers, the signal is applied to a number of correlators 408 to 418.

Beam formers BF-I 400 and BF-Q 406, and corresponding correlators CR-I 408 and CR-Q 418 receive and correlate the desired signal. The beam formers process the received signal so as to form a beam in the desired incoming direction. Phasing the signal by a multiplier vector forms the beam in the desired direction $\alpha$:

$$s(\phi) = [1, e^{-j\phi}, \ldots, e^{-j(N-1)\phi}]$$

wherein $$\phi = \left(2\pi \frac{d}{\lambda}\right)\sin(\alpha),$$

N is the number of antenna elements,
d the distance between antenna elements, and
λ is the wavelength used.
The output signal y(f) of the beam former=

$$\text{The output signal } y(t) \text{ of the beam former} = \sum_{0,\ldots N-1} s(\phi) x(t),$$

wherein x(t) is the received signal.

Let us view signal phasing and beam formation further by means of FIG. 4c, which shows the antenna array 300 and the radio frequency parts 302. In a typical embodiment, the antenna array 300 comprises N antenna elements 490a, 490b, 490c, which may be omni directional antennas, for example. Each antenna element is coupled to radio frequency parts 492a, 492b, 492c, which convert the received signal to an intermediate frequency and sample the signal to (I,Q) components in accordance with known technology. The obtained complex samples are then multiplied by corresponding complex weighting coefficients $w_i$, wherein i=1, . . . , N, in multipliers 494a, 494b, 494c. Multiplied samples 496a, 496b, 496c are applied via an adder 498 further to the correlators of the rake branch.

The complex weighting coefficients $w_i$, are selected according to an algorithm, which is usually adaptive, in such a way that an antenna pattern of the desired shape is obtained. Accordingly, in this example, the above formula s(φ) may be used.

The output signal of the beam former is applied to a correlator in which the signal is correlated with the desired code. The codes required by the correlators are generated in a code generator 420. In the preferred embodiment shown in FIG. 4a, the following codes (i.e. code phases) are generated:
  on-time I 422
  on-time Q 424
  early I 426
  late I 428
If needed, other code phases may also be generated, such as
  early Q and
  late Q.

A rake branch comprises a code phase and angle control processor 430, from which control signals are applied to beam formers 432 to 436. The control processor 430 receives information 312 from the search branch about the angle and delay of the desired signal component found by the search branch.

The beam formers BF-I 400 and BF-Q 406 receive information 432, 434 from the control processor 430 about the angles $\alpha_I$ and $\alpha_Q$ of the desired branches I and Q. Typically, the angles are identical, i.e. $\alpha_I = \alpha_Q$, but this is not necessarily the case.

The correlators CR-I 408 and CR-Q 418 receive an on-time I code phase 422 and an on-time Q code phase 424 from the code generators 420.

Beam formers BF-R 402 and BF-L 404 and corresponding correlators CR-RIGHT 410 and CR-LEFT 416 generate correlation results 438 and 440 for beams according to the angle of arrival which is slightly to the right and left with respect to the assumed angle of arrival of the signal. The beam formers BF-R 402 and BF-L 404 receive information 435, 436 from the control processor 430 about the desired angles $\alpha_R$ and $\alpha_L$. The correlators CR-RIGHT 410 and CR-LEFT 416 receive an on-time I code phase 422 from the code generators 420.

The beam former BF-I 400 and correlators CR-LATE 412 and CR-EARLY 414 generate correlation results 442 and 444 for the slightly delayed and advanced code phase corresponding to the assumed delay of the signal. The correlators CR-LATE 412 and CR-EARLY 414 receive code phases late I 428 and early I 426 from the code generators 420.

In this preferred embodiment of the invention, only signal I is used for right/left and early/late monitoring. Here, only signal Q or both of them can also be used. In the latter case, the number of beam formers and correlators slightly increases.

A rake branch comprises a delay and angle monitoring processor 446, to which the correlation results 448, 450 for the desired signals I and Q are received as input from the correlators CR-I 408 and CR-Q 418, and for monitoring, the right/left correlation results 438 and 440 from the correlators CR-RIGHT 410 and CR-LEFT 416 and the early/late correlation results from the corresponding correlators CR-LATE 412 and CR-EARLY 414. The monitoring processor 446 monitors the delay and angle of the desired signal, and controls the code phase and angle control processor 430.

The correlation results are compared in the monitoring processor 446 with the correlation results of the present angle ($\alpha_I$, and $\alpha_Q$) from the right and left sides ($\alpha_R$ and $\alpha_L$) of the present angle, and if either correlation yields a higher result than the present angle, the angle is updated in that direction. In other words, if CR-RIGHT>CR-I, then angle $\alpha_I$ ($\alpha_Q$) is shifted to the right, and if CR-LEFT>CR-I, then the angle is shifted to the left. As angle $\alpha_I$ ($\alpha_Q$) changes, angles $\alpha_R$ and $\alpha_L$ are updated correspondingly. Similarly, the correlation results for the early and late code phases are compared with the correlation results of the present code phase, and if either correlation yields a higher result than the present phase, the code phase is shifted in that direction. The monitoring processor 446 issues as control to the code phase and angle control processor 430 information about the necessary angle change Δα 452 and code phase change Δτ 454. The code phase and angle control processor 430 controls the code generators 420 with a control signal 456 and the beam formers with angle data 432 to 436 using the information it received from the monitoring processor.

From noise level calculation (to be described below), the monitoring processor 446 receives information 468 about the noise level, and this information allows the monitoring processor to detect the disappearance of a signal component, i.e. the fact that the present angle and code phase no longer can find a signal component. In this event, the monitoring processor sends to the search branch 308 information 316 about the loss of synchronization. The search branch then sends to the rake branch information 312 about the new angle and code phase to follow.

From the correlators CR-I 408 and CR-Q 418, the correlation results 448, 450 for the desired signal are applied to a demodulator 458, in which the desired signal is demodulated using known methods. The demodulator also 460 receives information about the noise level from noise level calculation, which will be described below. The demodulated signal 462 received from the demodulator can be applied to a decision means 464, in which the soft decisions generated by the demodulator are converted into hard bit decisions. The output signal 314a of the decision means is applied to the combiner 318, in which the signals of the different rake branches are combined. A rake branch can also be implemented without a decision means, whereby the receiver comprises a decision means after the combiner. This corresponds to the case in FIG. 3, in which the decision means 322 was shown after the combiner 318. In other words, if the rake branch comprises a decision means 464, the decision means 322 of FIG. 3 is not needed.

Let us next study noise level calculation for the received signal in the rake branch by means of FIGS. 4a and 4b.

Output signals 470, 472 of the beam formers BF-I 400 and BF-Q 406 are applied as input to two correlators, CR-IBF 474 and CR-QBF 476. These correlators receive code phases 478, 480 from a noise code generator 482. Here, the code phases are intentionally selected as erroneous as possible in order for the correlators to be able to calculate noise instead of a signal. The correlation results are applied to a demodulator 484, in which noise power 460 is determined and applied to the actual signal demodulator 458. As parameter to noise calculation is received a preset noise coefficient NOISE_TH_MUL 486, by which the noise power is multiplied in a multiplier 488, giving a noise threshold NOISE_TH 468, which indicates whether or not the actual signal component is lost. The noise threshold 468 is applied to the monitoring processor 446.

In a rake branch according to preferred embodiments of the invention, the monitoring processor 446 and the code phase and angle control processor 430 can be implemented by means of a general or signal processor or processors and suitable software, or also with separate components, or for example ASIC circuits. In conjunction with different measures, normal signal processing measures may naturally be carried out, for example filtering. However, these are not relevant to the invention and are not discussed herein.

The operation of the monitoring processor 446 is not necessarily continuous. To decrease the amount of calculation, beam directions and code delays can be controlled at desired, predetermined intervals. The calculation interval may also depend on the rate of change of the angle or the delay.

Figure 5A:
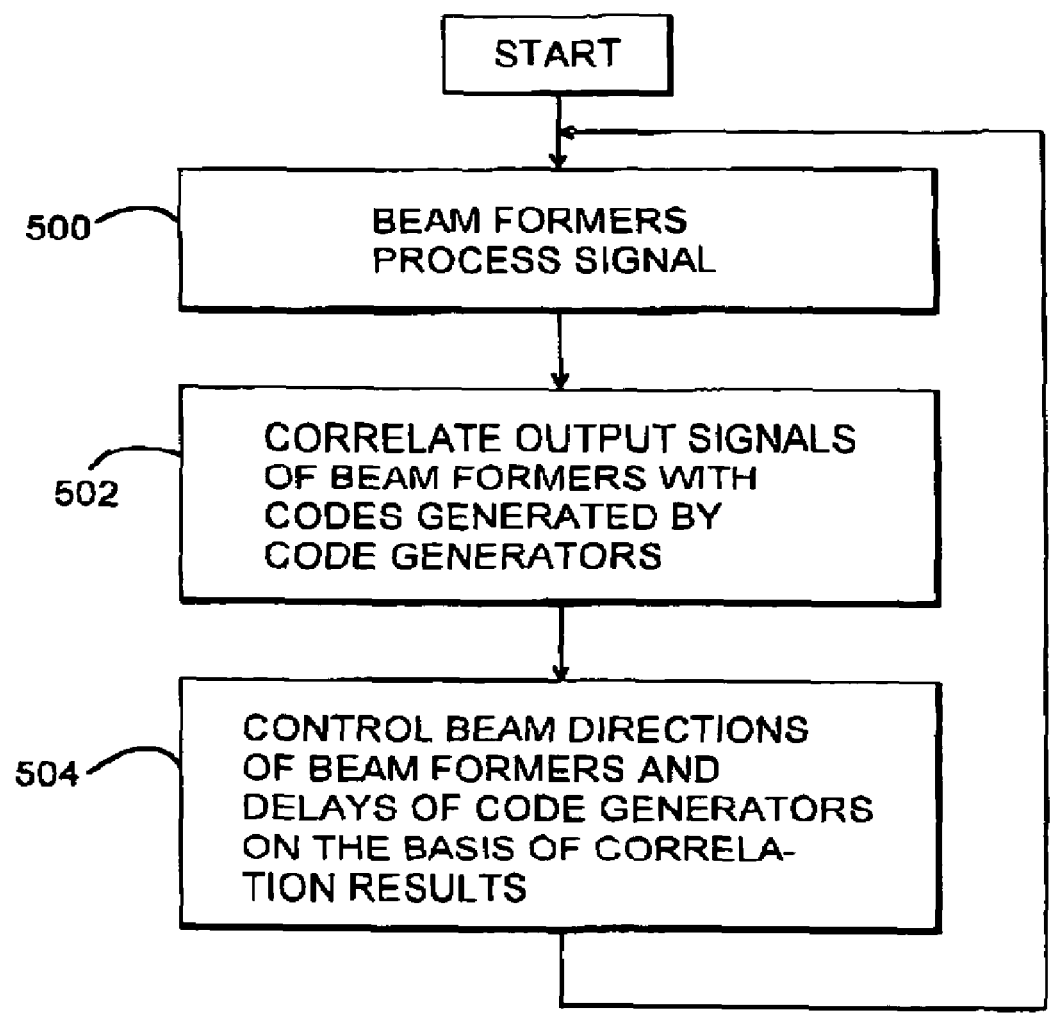
FIGS. 5a and 5b illustrate a method according to preferred embodiments of the invention.
Figure 5B:
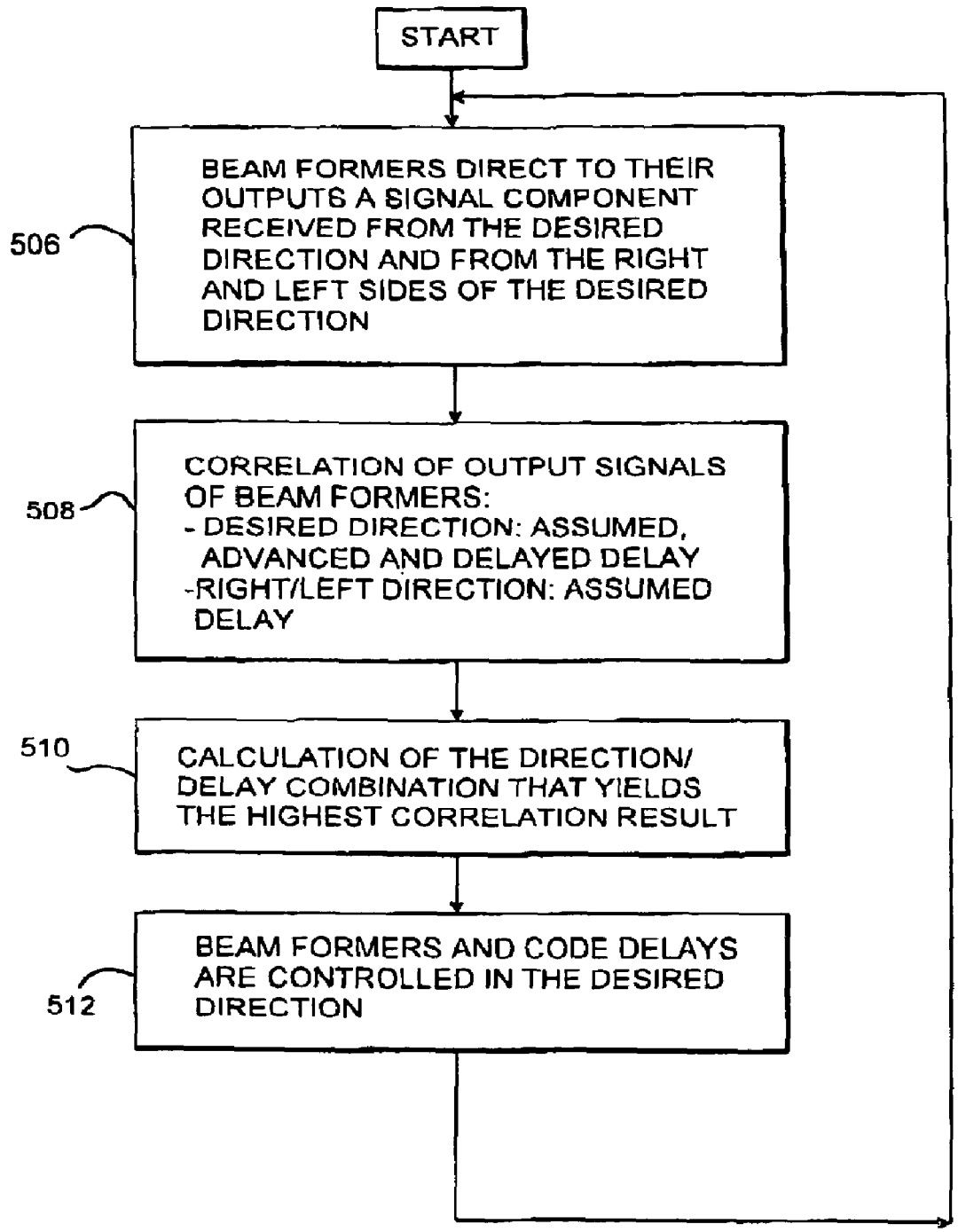

Let us further study the method of the invention by means of the flow charts shown in FIGS. 5a and 5b. FIG. 5a is a general description of the method.

The signal received in step 500 is processed in the beam formers.

In step 502, the output signal of the beam formers is correlated with the codes generated by the code generators.

In step 504, the direction of the beams formed by the beam formers and the delays of the codes generated by the code generators are controlled on the basis of the correlation results.

FIG. 5b is a more detailed description of the method.

In step 508, the beam formers direct to their output a signal component received from the desired direction and from the right and left sides of the desired direction.

In step 508, the output signal of the beam formers is correlated with the codes generated by the code generators such that the signal of the desired direction is correlated with an assumed code delay, an early and a late code delay. The signal from the right and left side of the desired direction is correlated with the assumed code delay.

In step 510, a calculation is made to see which direction/ delay combination gave the best correlation result.

In step 512, the directions of the beams formed by the beam formers and the delays of the codes generated by the code generators are controlled in the desired direction on the basis of the calculation carried out on the correlation results.

In a cellular radio system, the solution of the invention can be applied in a base station and in a subscriber terminal. The solution may also be applied in other radio system using a CDMA based multiple access method.

Even though the invention was described above with reference to the example in accordance with the attached drawings, it is obvious that the invention is not restricted thereto but can be modified in many ways within the scope of the inventive idea disclosed in the attached claims.

What is claimed is:

1. A receiver for receiving a signal of a desired user, which signal may arrive at the receiver in different components along several different paths at several different delays, the receiver comprising:

an antenna array composed of more than one element for receiving the signal, wherein the received signal comprises I- and Q-branches, one or more rake branches for demodulating the received signal, at least one search branch adapted to calculate a two-dimensional impulse response of the received signal by searching for incoming directions and delays of components of the received signal, and to transmit information indicating a most favorable signal component demodulated by the one or more rake branches, and in which at least one rake branch includes a plurality of beam formers including a first beam former, a plurality of correlators including a first correlator and being respectively coupled to the outputs of the beam formers, and a demodulator coupled to the outputs of the plurality of correlators, a code generator for generating the codes required by the plurality of correlators, control means adapted to control the operation of the code generator and the plurality of beam formers via at least one control signal, by which control means, information is received from the search branch about the incoming direction and delay of the most favorable signal component, and calculation means whose inputs include the outputs of the plurality of correlators, the calculation means being adapted to calculate and transmit to the control means, on the basis of the outputs of the plurality of correlators, information on how the code generator and the plurality of beam formers are to be controlled to ensure that the first beam former and the first correlator receive the most favorable signal component via the direction and delay calculated for this purpose, wherein, the plurality of correlators included in the at least one rake branch are adapted to calculate, for only one branch of the received signal, a correlation from a calculated incoming direction and from left and right sides of that incoming direction of that at least one rake branch, and wherein the calculation means are adapted to calculate a control signal for controlling the beam formers such that, if the correlation result calculated, for the only one branch of the received signal, from the left or right side of the incoming direction is higher than the correlation result obtained from the calculated incoming direction for the only one branch of the received signal, the first beam former is controlled to receive the signal from the left or right side of the incoming direction having the higher correlation result.

2. A receiver as claimed in claim 1, wherein the calculation means is adapted to calculate control information for the code generator and the beam formers such that the correlation value indicated by the output signal of the first correlator is as high as possible.

3. A receiver as claimed in claim 1, wherein the calculation means is adapted to calculate for the code generator a phase change and for the beam formers an angular change such that the correlation value indicated by the output signal of the first correlator is as high as possible.

4. A receiver as claimed in claim 1, wherein the calculation means is adapted to calculate control information for the code generator and the beam formers at predetermined intervals.

5. A receiver as claimed in claim 1, wherein the plurality of correlators are adapted to calculate the correlation before and after the calculated delay of the most favorable signal component.

6. A receiver as claimed in claim 5, wherein the calculation means is adapted to calculate the control signal of the code generator in such a way that if the correlation result calculated before or after the calculated delay of the most favorable signal component is higher than the correlation result obtained from the calculated delay, the code generator is operative to shift code phase to a phase before or after the calculated delay.

7. A receiver as claimed in claim 1, wherein at least one rake branch includes a noise code generator and a plurality of correlators which are coupled to the outputs of beam formers, wherein inputs of the respective correlators are coupled to the output of the noise code generator, the at least one rake branch further including a demodulator coupled to the respective outputs of the correlators, the demodulator being adapted to calculate noise level from the calculated incoming direction of the most favorable signal component.

8. A receiver as claimed in claim 1, wherein the code generator generates the following codes having different phases:
on-time I,
on-time Q,
late I,
early Q.

9. A method of receiving a signal of a desired user, which signal may arrive at the receiver in different components along several different paths at several different delays, the method comprising:
receiving the signal by an antenna array composed of more than one element, wherein the received signal comprises I- and Q-branches,
demodulating components of the received signal by one or more rake branches,
calculating a two-dimensional impulse response of the received signal by searching for incoming directions and delays of components of the received signal demodulated by the one or more rake branches,
determining a most favorable signal component,
transmitting information indicating the most favorable signal component demodulated by the one or more rake branches,
processing the signal at each rake branch by a first beam former of a plurality of beam formers included in each branch in such a way that the output signal of the beam former includes a signal component received from a desired direction,
correlating the output signal of the beam former in correlators, wherein said correlating includes calculating, for only one branch of the received signal, a correlation from a calculated incoming direction and from left and right sides of that incoming direction of each rake branch,
demodulating the correlated signal,
generating codes required by the correlators by a code generator,
controlling the code generator and beam formers on the basis of the incoming direction and delay of the signal component,
monitoring, for the only one branch of the received signal, the incoming direction and delay variation of the signal component on the basis of the output signals of the correlators, and
controlling the code generator and the beam formers by means of said monitoring,
wherein the beam formers are at least in part controlled by calculating, inside each rake branch, a control signal for controlling the beam formers such that, if the correlation result calculated, for the only one branch of the received signal, from the left or right side of the incoming direction is higher than the correlation result obtained from the calculated incoming direction for the only one branch of the received signal, the first beam former is controlled to receive the signal from the left or right side of the incoming direction having the higher correlation result.

10. A method as claimed in claim 9, wherein the code generator and the beam formers are controlled such that a correlation value indicated by the output signal of a correlator to which the signal received from the desired direction has been applied is as high as possible.

11. A method as claimed in claim 9, comprising calculating the correlation before and after the calculated delay of the most favorable signal component.

12. A method as claimed in claim 11, wherein the code generator is so controlled that if the correlation result calculated before and after the calculated delay of the most favorable signal component is higher than the correlation result obtained from the calculated delay, the code generator is operative to shift code phase to a phase before or after the calculated delay.

* * * * *